United States Patent [19]

Smith et al.

[11] Patent Number: 4,699,365
[45] Date of Patent: Oct. 13, 1987

[54] RECIRCULATING DOCUMENT FEEDER

[75] Inventors: John E. Smith, Holley; Thomas J. Murray, Rochester, both of N.Y.

[73] Assignee: Eastmak Kodak Company, Rochester, N.Y.

[21] Appl. No.: 862,854

[22] Filed: May 13, 1986

[51] Int. Cl.⁴ .......................... B65H 5/06; B65H 3/10
[52] U.S. Cl. ........................................ 271/3.1; 271/65; 271/186; 271/225; 271/303; 271/902; 355/3 SH; 355/14 SH; 355/23
[58] Field of Search .................... 271/3.1, 4, 225, 65, 271/276, 185, 186, 187, 301, 303, 902, 291; 355/3 SH, 14 SH, 23, 24, 25, 26, 77

[56] References Cited

U.S. PATENT DOCUMENTS

| 4,140,387 | 2/1979 | Gustafson | 355/14 SH |
| 4,169,674 | 10/1979 | Russel | 271/3.1 X |
| 4,174,905 | 11/1979 | DiFrancesco et al. | 355/23 X |
| 4,176,945 | 12/1979 | Holzhouser et al. | 355/23 |
| 4,243,316 | 1/1981 | Gustafson | 271/245 X |
| 4,264,067 | 4/1981 | Adams et al. | 355/23 X |
| 4,319,833 | 3/1982 | Hidding | 355/23 |
| 4,330,197 | 5/1982 | Smith et al. | 355/14 SH |
| 4,411,517 | 11/1983 | Gerken | 355/14 SH |
| 4,412,740 | 11/1983 | Buddendeck et al. | 355/14 SH |
| 4,553,828 | 11/1985 | Burger | 355/14 SH X |

FOREIGN PATENT DOCUMENTS 2448854 7/1975 Fed. Rep. of Germany ........ 271/65

Primary Examiner—Joseph J. Rolla
Assistant Examiner—Edward S. Ammeen
Attorney, Agent, or Firm—Lawrence P. Kessler

[57] ABSTRACT

A recirculating document feeder for presenting document sheets to a copier apparatus for reproducing multiple collated sets of information respectively contained on one face of such document sheets, or information respectively contained on both faces of such sheets, at a rate which makes maximum use of the full reproduction rate of the copier apparatus. In the recirculating document feeder, during the first circulation of a set of document sheets, after both sides of each sheet are exposed to reproduce information contained thereon, such sheets are returned to the hopper with their facial orientation reversed with respect to their initial facial orientation in the hopper. During all during subsequent circulations of such document sheets except the last circulation, after both sides of each sheet are exposed to reproduce information contained thereon, such sheets are returned to the hopper with the facial orientation reversed with respect to their initial facial orientation in the hopper. During the last circulation, after both sides of each sheet are exposed to reproduce information contained thereon, such sheets are returned to the hopper with their facial orientation the same as their initial facial orientation in the hopper. The document feeder can also present individual document sheets to the copier platen for reproducing information contained on only one face of an individual document sheet, or information contained on both faces of an individual document sheet.

8 Claims, 17 Drawing Figures

RECIRCULATING DOCUMENT FEEDER

BACKGROUND OF THE INVENTION

This invention relates generally to recirculating document feeders, and more particularly to a recirculating document feeder capable of presenting sheets of simplex or duplex documents to a copier apparatus in a manner which enables the copier apparatus to reproduce collated sets of such documents at a reproduction rate which makes maximum use of the full reproduction rate of the copier apparatus.

Today's commercially available copier apparatus are capable of making reproductions at a significant rate (e.g., seventy to one hundred copies per minute). Such high reproduction rates are possible, at least in part, due to advances in document feeders for automatically presenting documennt sheets to the copier platen, and in the copier apparatus itself. For example, U.S. Pat No. 4,176,945 (issued Dec. 4, 1979, in the name of Holzhauser et al) shows a high speed copier apparatus and a recirculating document feeder associated with such copier apparatus. Such arrangement is capable of producing simplex (one sided) or duplex (two sided) copy on a receiver sheet on a single pass of such sheet through such apparatus in order to accomplish a high reproduction rate.

The structure of the aforementioned U.S. Pat. No. 4,176,945 in a simplex mode of operation, circulates document sheets seriatem from a hopper to the copier platen and back to the hopper at a rate which enables reproductions to be made in collated order at a rate which fully utilizes the high reproduction rate of the copier. In a duplex mode of operation, the structure circulates document sheets seriatem from the hopper, across the copier platen to a turn-over mechanism, back to the platen where one side is exposed, again to the turn-over mechanism and back to the platen where the opposite side is exposed, and then back to the hopper. Such sequence, which is necessary to assure reproduction of the document sheets in a proper order to obtain collated output, does not fully utilize the high reproduction rate of the copier apparatus due to the extended length of the path traveled by the document sheets to the turn-over mechanism before exposure of each side of the sheets.

SUMMARY OF THE INVENTION

This invention is directed to a recirculating document feeder for presenting document sheets to a copier apparatus for reproducing multiple collated sets of information respectively contained on one face of such document sheets, or information respectively contained on both faces of such sheets, at a rate which makes maximum use of the full reproduction rate of the copier apparatus. When reproduction of information respectively contained on only one face of document sheets is desired, the sheets are fed seriatem from a hopper to a station for exposure and thereafter returned to the hopper in the same facial orientation as their initial facial orientation in the hopper. On the other hand when reproduction of information respectively contained on both faces of document sheets is desired, during the first circulation of each sheet, after both sides of each sheet are exposed to reproduce information contained thereon, each sheet is returned to the hopper with its facial orientation being reversed with respect to its initial facial orientation in the hopper. During subsequent circulations of each sheet, after both sides of each sheet are exposed to reproduce information contained thereon, each sheet is returned to the hopper with its facial orientation being reversed with respect to its initial facial orientation. Moreover, during the last circulation of each sheet, after both sides of each sheet are exposed to reproduce information contained thereon, each sheet is returned to the hopper with its facial orientation being the same as its initial facial orientation.

The document feeder can also present individual document sheets to the copier platen for reproducing information contained on only one face of an individual document sheet, or information contained on both faces of an individual document sheet. When reproduction of information on only one face of an individual document sheet is desired, such sheet is advanced along a non-recirculating path across the exposure station with exposure of the face of such sheet directed toward the exposure station occurring when such sheet is over such station. On the other hand when reproduction of information on both faces of an individual document sheet is desired, such sheet is advanced along the non-recirculating path across the exposure station with exposure of the face of such sheet directed toward the exposure station occurring when such sheet is over such station. Thereafter such sheet is turned over and returned to the exposure station where its opposite face is directed toward the exposure station and exposed, and then such sheet is advanced along the non-recirculating path away from the exposure station to an exit hopper for operator retrieval.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
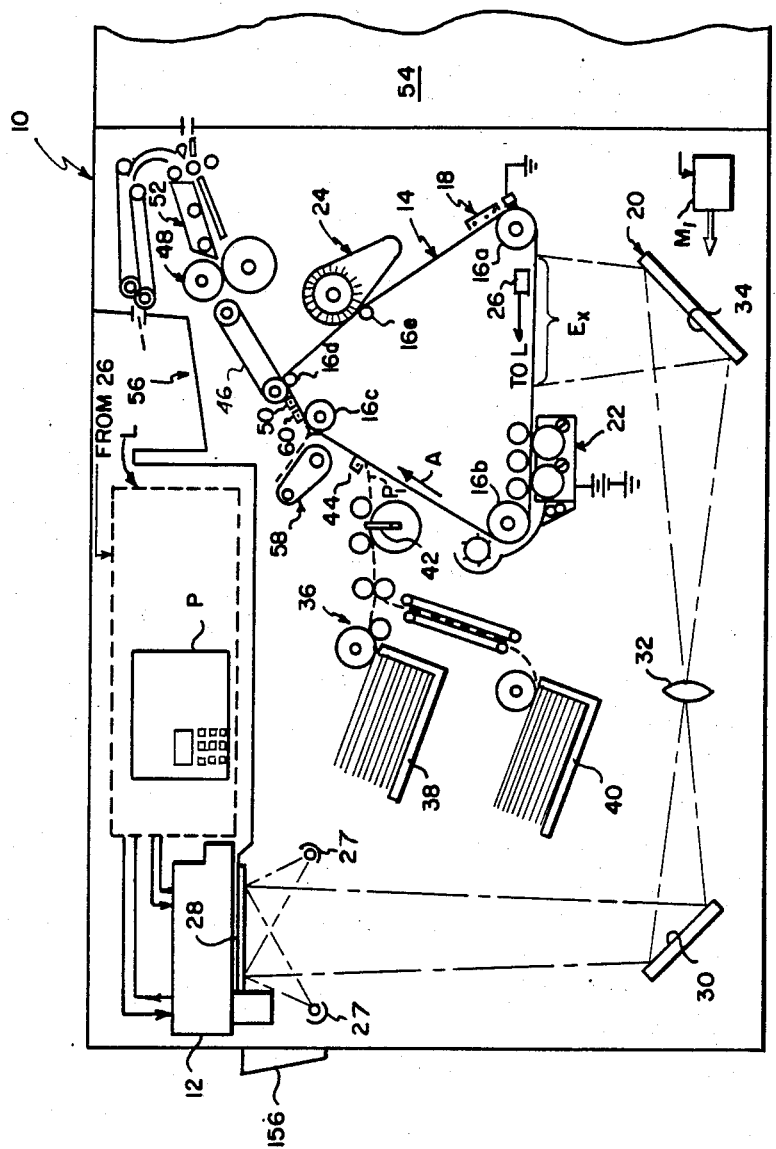
FIG. 1 is a schematic illustration of a copier apparatus incorporating a document feeder according to this invention.

Referring now to the accompanying drawings, FIG. 1 shows an exemplary reproduction apparatus (copier), designated generally by the numeral 10, with which a document feeder 12 according to this invention is associated. The apparatus 10 is herein described only to the extent necessary for a full understanding of this invention. For a more complete description of the exemplary reproduction apparatus, see for example U.S. Pat. No. 4,174,905 issued Nov. 20, 1979, in the name of Difrancesco et al. Of course, other reproduction apparatus are suitable for use with this invention.

The reproduction apparatus 10 includes an endless belt 14 entrained about a plurality of rollers 16a–16e, the rollers describing a closed loop path for such belt. One of the rollers (e.g. 16a) is coupled to a motor $M_1$ for transporting the belt 14 about the closed loop path, in the direction of arrow A, in operative relation to electrographic process stations whereby operation of such stations form marking particle developed, transferrable images of original information on the belt. The belt 14 is a composite construction including a photoconductive layer and a grounded support layer, such as shown in U.S. Pat. No. 3,615,414 (issued Oct. 26, 1971, in the name of Light) for example. The electrographic process stations include a charging apparatus 18, an exposure mechanism 20, a developer apparatus 22, and a cleaning mechanism 24.

Under the control of a logic and control unit L, the motor $M_1$ rotates the roller 16a to transport the belt 14 about its closed loop path into operative relation with the electrographic process stations. The unit L includes, for example, a microprocessor receiving operator input signals from panel P and signals from a timing signal generator 26 detecting the movement of the belt 14 about its closed loop path. Based on such signals and a program from the microprocessor, the unit L produces signals to control the transport of the belt 14 and the operation of the various electrographic process stations for carrying out the reproduction process. The production of a program for a number of commercially available microprocessors such as INTEL Model 8080 or Model 8085 microprocessor (which along with others are suitable for use with the invention), is a conventional skill well understood in the art. The particular details of any such program would, of course, depend on the architecture of the designated microprocessor.

In the operation of the reproduction apparatus 10, the motor $M_1$ rotates the roller 16a to move a portion of the photoconductive layer of belt 14 past the charging apparatus 18. The charging apparatus is, for example, a corona charger coupled to a potential source (not shown) which deposits a uniform electrostatic charge on the portion of the belt 14. After being charged, such portion moves through a zone $E_x$ relative to exposure mechanism 20. The exposure mechanism 20 includes lamps 27 which illuminate the information-containing face of a document located in juxtaposition with a transparent platen 28 by the feeder 12 in the manner to be explained hereinbelow. A reflected light image of such document information is projected along an optical path via mirror 30, lens 32, and mirror 34 onto the belt 14 in the exposure zone. Accordingly, the reflected light image of the document exposes the photoconductive layer of the belt 14 and alters the uniform charge thereon to form a charge pattern corresponding to such image.

After the image-wise charge pattern is formed on the photoconductive layer, the portion of the belt 14 bearing such pattern is moved into operative relation with the developer apparatus 22. The developer apparatus 22, which may be, for example, a magnetic brush developer of the type described in U.S. Pat. No. 3,457,900 (issued July 29, 1969 in the name of Drexler), brings pigmented marking particles into contact with the photoconductive layer. Such particles adhere to the charge pattern on such layer to develop the pattern into a transferable image. A receiver sheet transport mechanism, designated generally by the numeral 36, advances a receiver sheet from a first supply 38 or second supply 40 along the path $P_1$ into contact with the belt 14. A registration mechanism 42 times the arrival of the receiver sheet with the movement of the transferable image on the belt so that the two are in register.

The transferable image on the belt 14 is transferred from the belt to the receiver sheet by an electrostatic field produced, for example, by a charger 44 coupled to a potential source (not shown). The receiver sheet advances with the belt 14 to a transport mechanism 46 which strips the sheet from the belt and transports the sheet to a fusing mechanism 48 where the transferred image is fixed to the sheet by heat and/or pressure for example. Stripping of the receiver sheet from the belt 14 is aided by a detack charger 50 coupled to a potential source (not shown) for example. After the image is fixed to the receiver sheet, the sheet is transported by mechanism 52 to an output device 54, such as a finisher or binder for example, or to a hopper 56 for operator retrieval. Substantially simultaneously, the portion of the belt 14 previously bearing the transferable image moves past the cleaning mechanism 24, where any residual marking particles on the belt are removed, and returned toward the charging apparatus 18 to be readied for repeat of reproduction process.

The particular exemplary reproduction apparatus 10 of FIG. 1 is capable of making duplex reproductions in a single pass of a receiver sheet through the apparatus. To make a duplex reproduction, two transferable images for respective transfer to opposite faces of the receiver sheet are sequentially produced on the belt 14 in adjacent areas (in the direction of belt travel). The first image is transferred to one face of the receiver sheet by the charger 44 in the manner described above. The receiver sheet is thereafter stripped from the belt 14 by the transport mechanism 58. The mechanism removes the sheet entirely from the belt 14 and then returns the sheet to the belt along the same path in a turned over condition in register with the second image on the belt. The second image is then transferred to the opposite face of the receiver sheet by an electrostatic field produced by a charger 60 coupled to a potential source (not shown). The receiver sheet bearing the transferred images on both faces is thereafter transported through the fusing mechanism 48 in the manner described above where the images are fixed thereto and delivered to the output device 54 or hopper 56.

Figure 2:
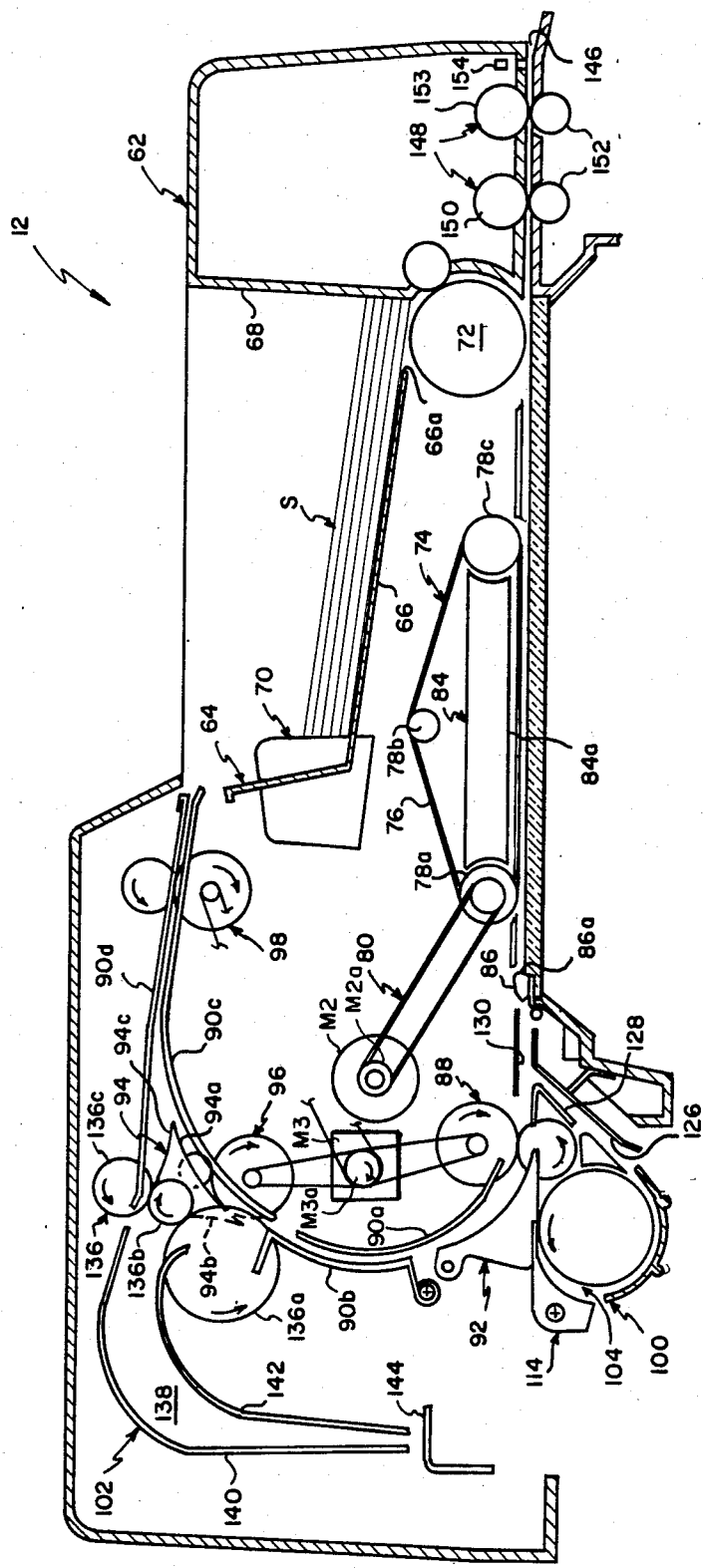
FIG. 2 is a side elevational view of the document feeder according to this invention, partly in cross-section and with portions broken away or removed to facilitate viewing.

The document feeder 12, according to this invention, is constructed to present simplex or duplex document sheets in juxaposition with the transparent platen 28 of the reproduction apparatus 10 so that simplex or duplex reproductions may be made thereby. As shown in FIG. 2, the feeder 12 includes a housing 62 within which a hopper 64 is located for supporting a set of document sheets S. The hopper 64 comprises a readily accessible tray 66 angled slightly downward from the horizontal toward a striker plate 68. Document sheets placed on the tray 66 by an operator are urged by gravity against the plate 68 for alignment of the forward edges of such sheets. A jogger and set-completed detector 70 (more fully described in U.S. Pat. No. 4,169,674, issued Oct. 2, 1979, in the name of Russel) are located at the opposite end of the tray 66.

A sheet feeding device, such as an oscillating vacuum feeder 72 for example, is located in juxtaposition with an opening 66a in the tray 66. The feeder 72 selectively vacuum tacks the bottom-most sheet in the set S to the peripheral surface thereof and removes such sheet from the set by rotating in a clockwise direction to advance such sheet to a transport mechanism 74. The mechanism 74 comprises a ported belt 76 entrained about rollers 78a–78c, the rollers describing a closed loop travel path for such belt. The roller 78a is coupled by a belt-and-pulley mechanism 80 to a reversible motor $M_2$ to selectively drive the belt 76 in either direction about its closed loop path. The motor $M_2$ is, for example, a DC motor in which reversal of the applied potential determines the direction of rotation of the motor output shaft $M_{2a}$. Initially the motor $M_2$ is operated to rotate the roller 78a in a direction which drives the belt 76 in a clockwise direction about its closed loop path. A vacuum plenum 84 is located within the closed loop path of the belt 76 and has a ported bottom plate 84a whereby vacuum from the plenum is effective through the ported plate and the ported belt 76 to tack a sheet to the belt for movement therewith relative to the platen 28 (i.e. from right to left in FIG. 2).

During exposure, a document sheet is stopped over the platen 28. To insure that the document sheet is in proper register so that the reflected light image of the information contained thereon is directed to the appropriate area of the photoconductor belt 14, a registration gate 86 is provided adjacent to one edge of the platen 28. The gate 86, which is mounted in the apparatus 10, is movable to a first position intercepting the travel path of a document sheet advanced across the platen, or to a second elevated position out of such travel path to enable the sheet to pass underneath the gate (for a more complete description of the registration gate and the mechanism for moving the gate to its first or second position, see U.S. Pat. No. 4,243,316, issued Jan. 6, 1981, in the name of Gustafson). When the gate 86 is in its first position, the surface 86a of the gate provides an edge against which a document sheet advanced by the transport mechanism 74 is stopped at a registered location on the platen; and when the gate is in its second position, the mechanism 74 advances the sheet under the gate to a set of nip rollers 88.

Figure 7:
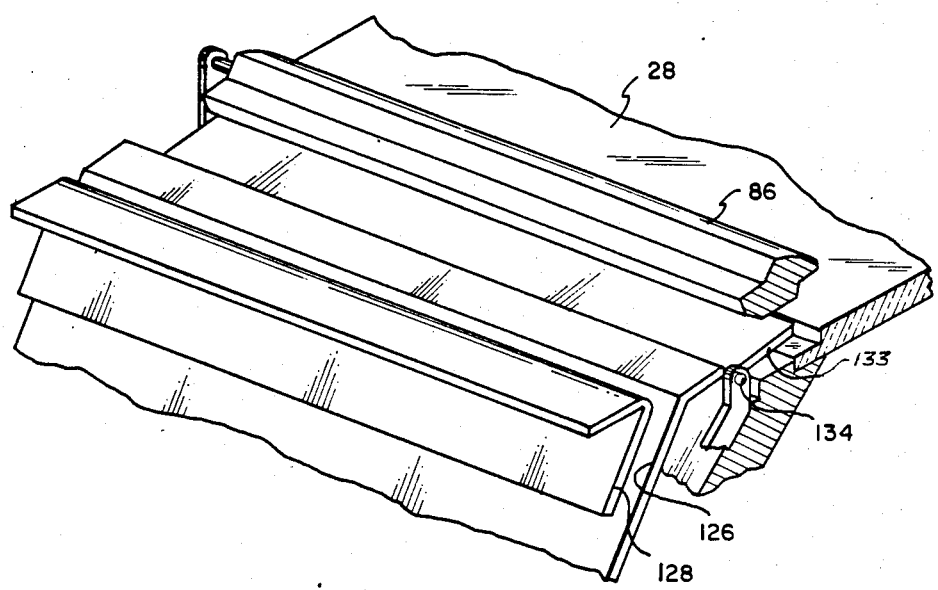
FIG. 7 is a perspective view of the platen assist sheet guide and registration gate, partly in cross-section and with portions removed to facilitate viewing.
Figure 8:
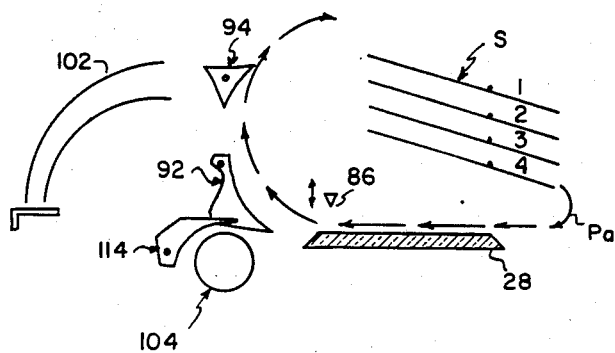
FIG. 8 is a diagramatic illustration of the operation of the document feeder according to this invention for transporting simplex document sheets.

The nip rollers 88 are driven in the indicated direction, through a belt-and-pulley mechanism, by the motor $M_3$. When reproduction of information contained on only one face of the respective document sheets (e.g., simplex document sheets) in set S is desired, the nip rollers 88 advance the sheet from the platen into a path described by guides 90a–90d and diverters 92, 94 (located in their respective positions shown in FIG. 2). Additional nip roller sets 96 and 98, also driven for example by motor $M_3$, advance the sheet along such path to return the sheet to the hopper 64. On return to the hopper, the document sheet is received on the top of the set in the same facial orientation as its initial facial orientation in the set. As particularly shown in FIG. 7, the document sheet set S is initially placed in the hopper with the respective information-containing faces of each sheet being oriented face up. Ideally the set is in page sequential order with the first page on top. In this manner, the document sheets are advanced seriatem from the hopper, last page first, advanced along path $P_a$ with their respective information-containing faces directed toward the platen 28, exposed at the platen, and returned to the hopper in their initial facial orientation. Reproductions of the set would then be made at the full reproduction rate of the apparatus 10. The reproductions, whether simplex or duplex, would be stacked, for example in the output device 54 or the hopper 56, collated in the same page sequential order.

Figure 3:
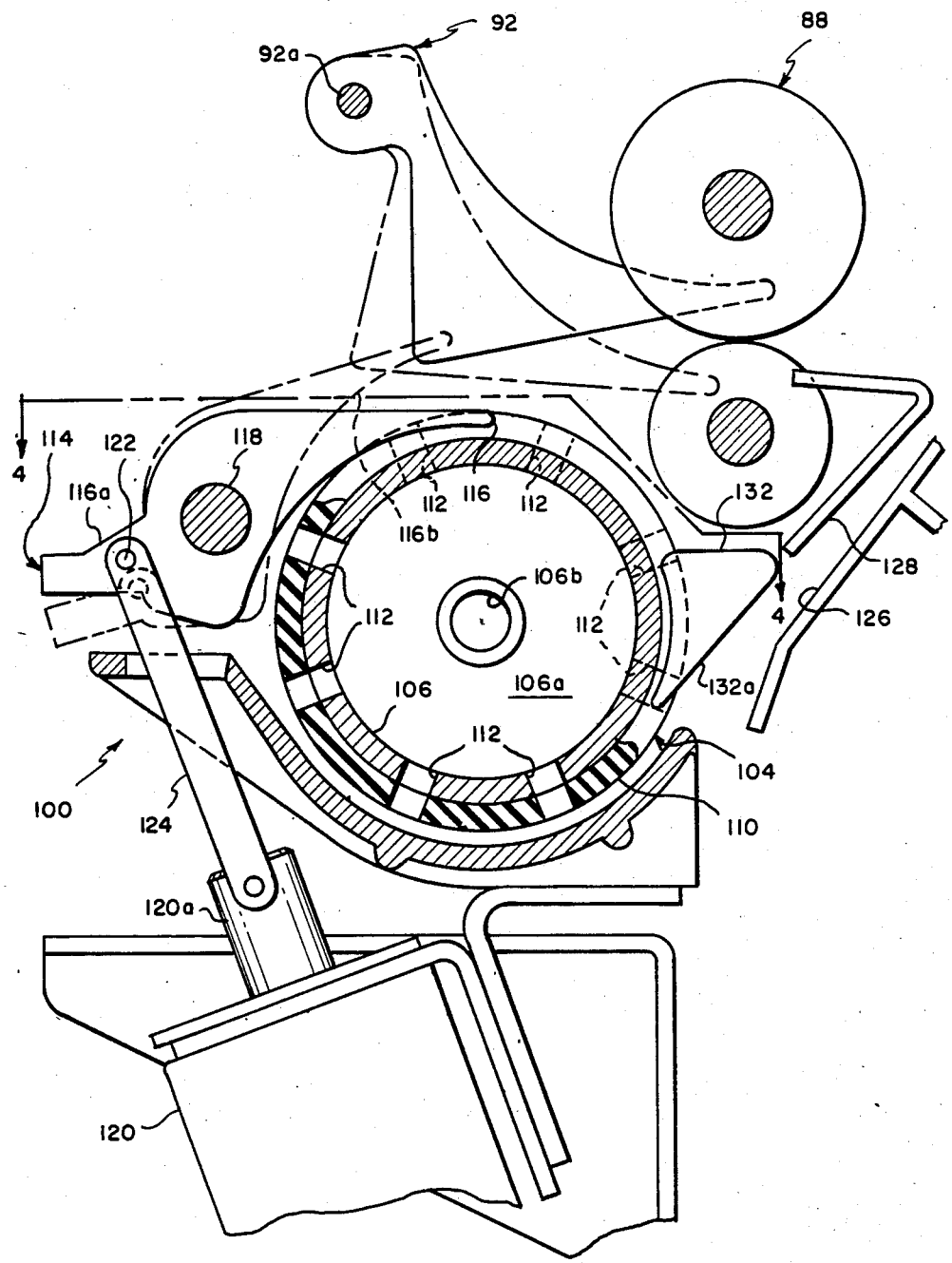
FIG. 3 is a side elevational view, on an enlarged scale and partly in cross-section, of a portion of the copier apparatus and document feeder, including the first sheet turn-over mechanism.

In order to maximize the use of the full reproduction rate of the apparatus 10 in making reproductions of information contained on both faces of the respective document sheets in set S (e.g. duplex document sheets), turn-over devices 100 and 102 are provided. The turn-over device 100 (best shown in FIGS. 2, 3, 4 and 5) includes a roller 104 mounted for rotation in the reproduction apparatus 10. The roller 104 comprises a hollow tube 106 closed at both ends to form a chamber 106a (see FIG. 3). One end of the tube 106 has an opening 106b coupled to a vacuum source (e.g., the vacuum source associated with plenum 84), while the opposite end carries a stub shaft 106c on which a pulley 106d (see FIG. 5) is fixed. The pulley 106d is coupled to the output shaft $M_{3a}$ of motor $M_3$ through a belt-and-pulley arrangement 108 to rotate the tube 106 in a counter-clockwise direction (as viewed in FIGS. 2, 3 or 5). A plurality of circumferential rings 110 are mounted in spaced relation on the periphery of the tube 106 (see FIG. 4). The rings 110 and tube 106 have a plurality of intercommunicating ports 112 which enable the vacuum from the source coupled to the tube chamber 106a to be effective to tack a document sheet to the peripheral surface of the roller 104 for rotation therewith.

Figure 4:
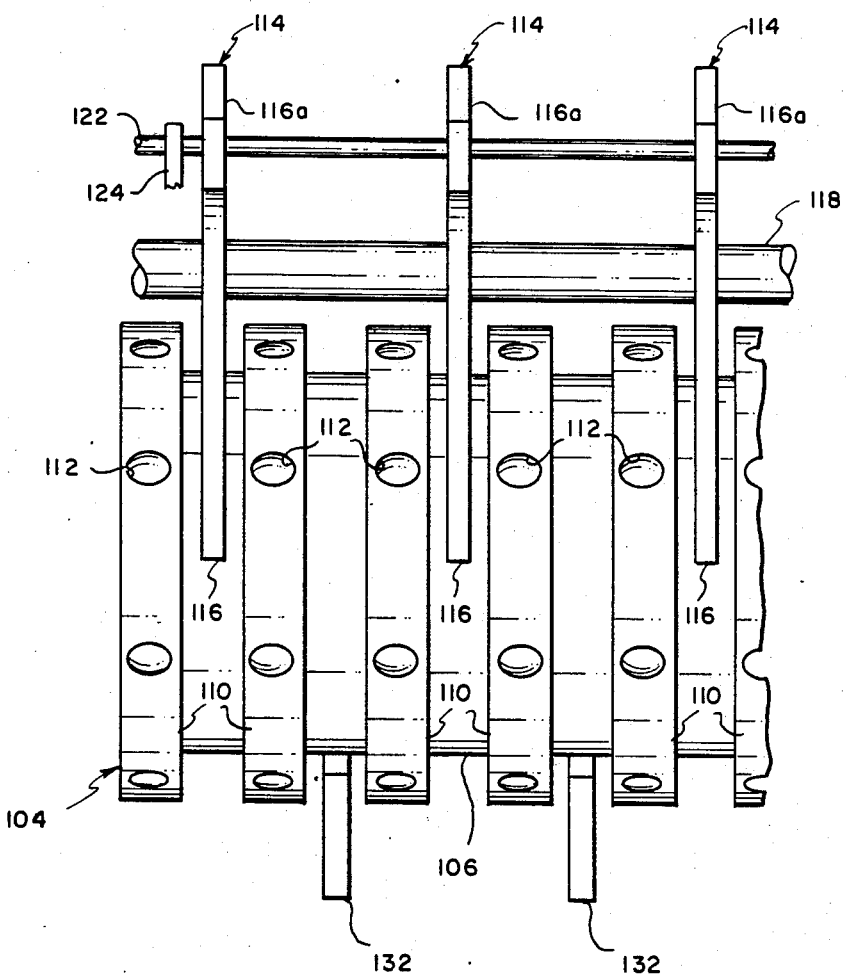
FIG. 4 is a top plan view of the turn-over roller and sheet stripper of the first sheet turn-over mechanism, taken on lines 4—4 of FIG. 3.
Figure 5:
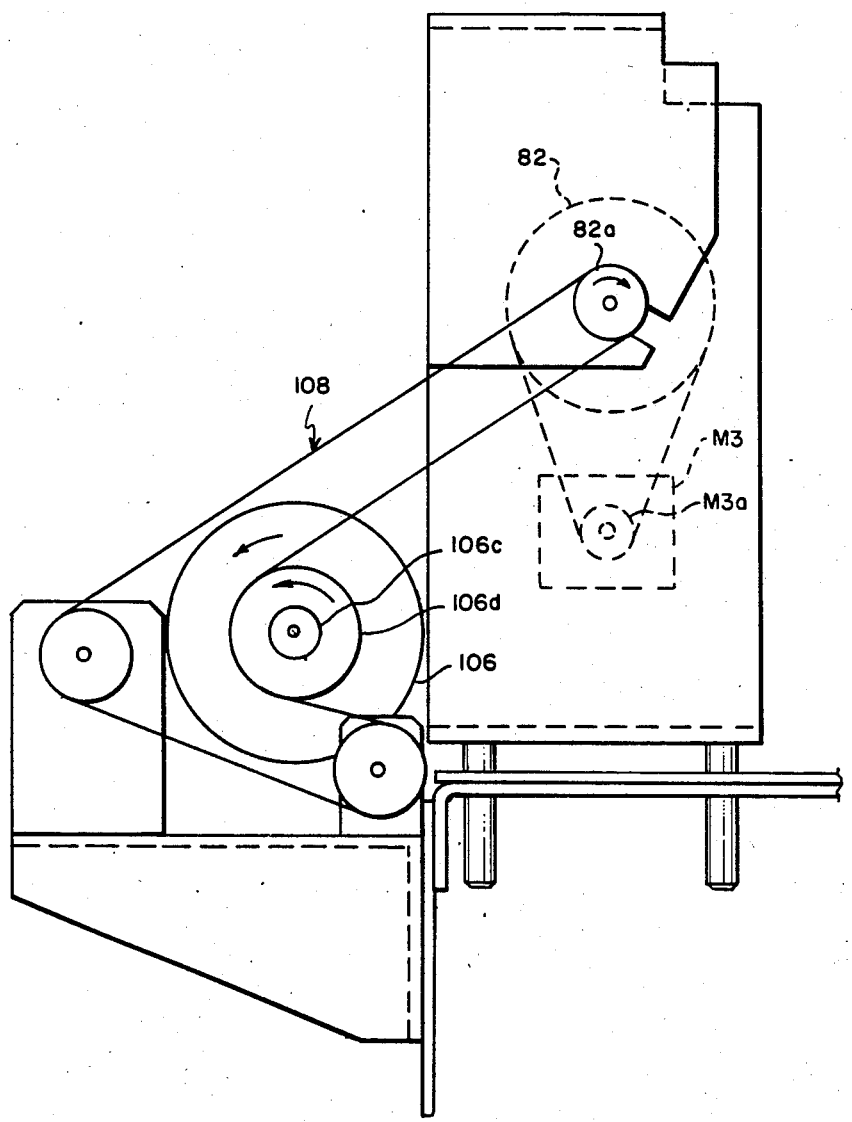
FIG. 5 is a side elevational view, on an enlarged scale, of the turn-over roller drive.

A document sheet is directed from the nip roller set 88 toward the turn-over device 100 by pivoting the diverter 92 about its support shaft 92a to its solid line position (of FIG. 3) from its phantom line position. A diverter mechanism 114 is utilized to direct the document sheet into contact with the roller 104 of the turn-over device 100. The diverter mechanism 114 comprises a plurality of diverter blades 116 mounted for pivotable movement about a shaft 118. As seen in FIG. 4 the blades 116 are spaced along the shaft 118 to lie in respective planes between the planes respectively passing through rings 110. The blades 116 are pivoted about the shaft 118 to their respective phantom line positions (of FIG. 3) by means of a solenoid 120. The solenoid 120 has a retractable armature 120a coupled by a link 124 to a shaft 122 supported in portions 116a of the blades. On movement of the blades to their phantom line positions by retraction of the solenoid armature 120a, the surfaces 116b of the blades intercept the document sheet travel path and direct the sheet into contact with the roller 104.

When the document sheet contacts the roller 104, the vacuum in the chamber 106a tacks the sheet to the peripheral surface of the rings 110 of the roller for rotation therewith. The rotation of the roller 104 advances the document sheet toward a travel path defined by guides 126, 128, and 130. A plurality of stripper plates 132 are mounted in spaced relation to lie in respective planes between the planes respectively passing through rings 110 (see FIG. 4). The plates 132 respectively have surfaces 132a which strip the lead edge of a document sheet from the roller 104 and direct the sheet, as it is being advanced by continued rotation of the roller, into the throat between guides 126 and 128. As the lead edge of the document sheet emerges from the throat, it strikes guide 130, (or the trail portion of the sheet) and is thereby directed toward the platen 28 in a turned over condition (i.e. the face previously directed toward the platen is now directed away from the platen). At this point in time, the registration gate is in its raised position so that the document sheet can be advanced back over the platen where it again comes under the control of the transport mechanism 74. The operation of the motor $M_2$ is reversed to rotate the roller 78a in a direction which drives the belt 76 in a counter-clockwise direction about its closed loop path to transport the document sheet from left to right in FIG. 2 over the platen 28. Once the trail edge of the document sheet passes under the registration gate 86, the gate is returned to its registration location and the operation of the motor $M_2$ is again reversed. The transport mechanism 74 then functions to return the document sheet into engagement with the gate (i.e. the document sheet is transported from right to left). The document sheet is thus stopped by the gate 86 at the registered location for exposure.

Figure 6:
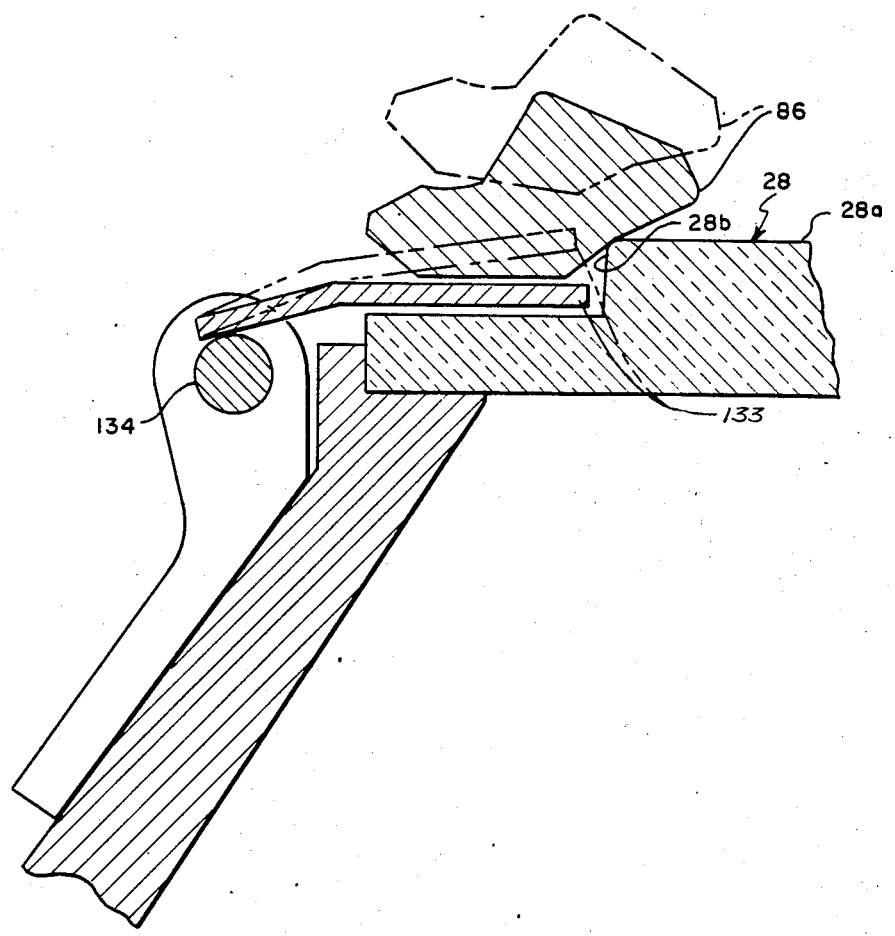
FIG. 6 is a side elevational view, on an enlarged scale, of the platen assist sheet guide.

A pivotable ramp 133 (see FIGS. 2, 6 and 7) is provided to insure that the document sheet returns to the transport mechanism 74 without jamming. The ramp 133 is mounted on a pivot shaft 134. Selective rotation of the shaft 134 moves the ramp to a first position (solid line position of FIG. 6) or a second position (phantom line position of FIG. 6). When the ramp is in its first position, it is below the top surface 28a of the platen 28 to provide unobstructed movement to a document sheet moving from above the platen surface to the left. When the ramp is in its second position, it directs the document sheet moving from the left toward the platen surface over the platen lip 28b so that the sheet does not stub against such lip which might result in a jam.

The turn-over device 102 comprises a three-roller cluster 136 (see FIG. 2). The middle roller 136b of the cluster 136 is coaxially located on the pivot axis of the diverter 94. The turn-over device 102 also includes a sheet receiving chamber 138, the boundaries of which are formed by guide plates 140, 142 and a resilient stop member 144. To employ the device 102 for turning over a document sheet, the diverter 94 is moved from its position where its surface 94a defines the document sheet travel path for returning a sheet directly to the hopper 64 to a position where surface 94b intercepts the document sheet travel path. With the rollers of the cluster 136 rotating in the directions as indicated (in FIG. 2), the document sheet is directed by the surface 94b of the diverter 94 into the nip between rollers 136a and 136b and advanced into the chamber 138. The plates 140, 142 guide the sheet in a direction toward the resilient stop member 144. When the lead edge of the document sheet strikes the stop member, it rebounds thereby reversing its direction of travel so that the lead edge becomes the trail edge. Due to the shape of the chamber 138 and the beam strength of the document sheet, the new lead edge of the moving document sheet is directed to enter the nip between rollers 136b and 136c to advance the sheet over surface 94c of the diverter 94. The document sheet is thus returned to the travel path defined by guides 90c, 90d in a turned over condition for delivery to the hopper 64 with the facial orientation thereof being opposite to its initial facial orientation.

The steps in the operation of the document feeder 12 and the associated turn-over devices 100 and 102 for making reproductions of information contained on both faces of respective document sheets in set S with maximized use of the full reproduction rate of the apparatus 10 are shown in FIGS. 9a–9c, 10a–10c, and 11. In these figures, the exemplary document set S consists of a three-sheet, duplex document (six pages) with the information contained on a document sheet shown for convenience as a dot associated with a sheet face, the dots being respectively numbered to represent a page number. While the shown page numbering represents a preferred order (i.e., page sequential order, first page on top), other orders may be utilized (e.g., page sequential order, first page on the bottom).

Figure 9A:
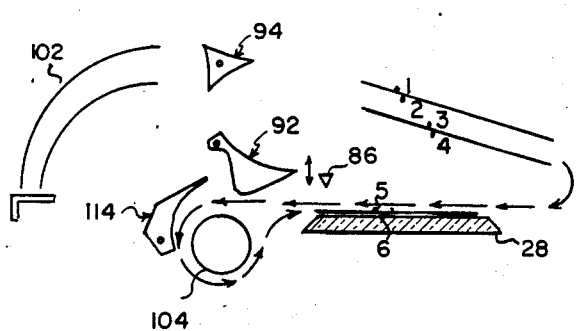
FIGS. 9a–9c are diagramatic illustrations of the operation of the document feeder according to this invention for transporting duplex document sheets, showing the first document set circulation.
Figure 9B:
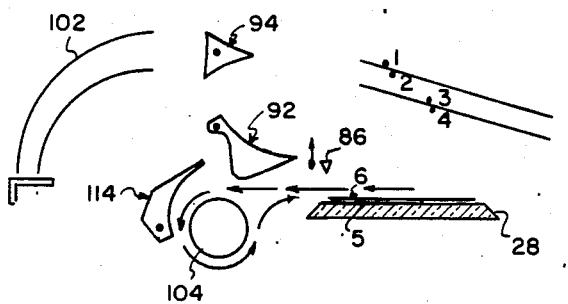
Figure 9C:
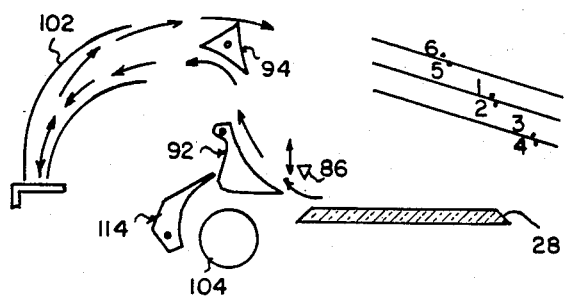

The first circulation for each of the document sheets in the set S is shown in FIGS. 9a–9c. The bottom-most document sheet is removed from the hopper 64 by feeder 72 and advanced across the platen 28 by the transport mechanism 74 with the belt 76 moving about its closed loop path in a clockwise direction and the registration gate 86 in its raised position. The diverters 92 and 114 are positioned to direct such sheet to the roller 104. The roller advances such sheet back toward the platen. The drive for transport mechanism 74 is reversed to move the belt 76 in a counter-clockwise direction and advance such sheet fully over the platen with its trail edge moving past the gate 86. Thereafter the gate is lowered to its registration position and the drive for transport mechanism 74 is again reversed to bring such sheet into registered contact with the gate. As shown in FIG. 9a, page 6 is directed toward the platen 28 and is exposed to make a reproduction thereof. Thereafter, the gate 86 is raised and such sheet is transported in a like manner by transport mechanism 74 and roller 104 away from, and back to, the platen 28 (see FIG. 9b). Once the trail edge of such sheet moves past the gate, the gate is lowered and such sheet is moved by transport mechanism 74 into registered contact therewith. Page 5 then is directed toward the platen and exposed to make a reproduction thereof. Thereafter, the gate 86 is raised and diverters 92 and 94 are moved to their respective position shown in FIG. 9c. Such document sheet is then advanced from the platen 28 into the turn-over device 102 and back to the hopper 64 with page 6 on top. This procedure is repeated for the remaining document sheets in the set S so that reproductions of the pages are made in the proper sequential order (i.e. 6, 5, 4, 3, 2, 1) for collated stacking in the output device 54 or the hopper 56. After all the sheets have been circulated once, their order in the hopper 64 will be as follows: 2, 1, 4, 3, 6, 5.

The timing of document sheet movement during this first circulation is regulated relative to the full reproduction rate of the apparatus 10 so that a document sheet is located over the platen 28 each time an image-receiving area of the photoconductor belt 14 is located in the exposure zone $E_x$. Since no exposure occurs the first time a document sheet is over the platen (and thus no reproduction is made), during the described first circulation of the document sheets of the set S, the apparatus reproduction rate is utilized at only two-thirds of its full potential rate. However, during subsequent circulations, utilization of the full apparatus reproduction rate is accomplished because of the facial orientation of the document sheets resulting from the above-described first circulation. That is to say, after the new facial orientation is established, each time a document sheet is over the platen an exposure occurs (and a reproduction is made).

Figure 10A:
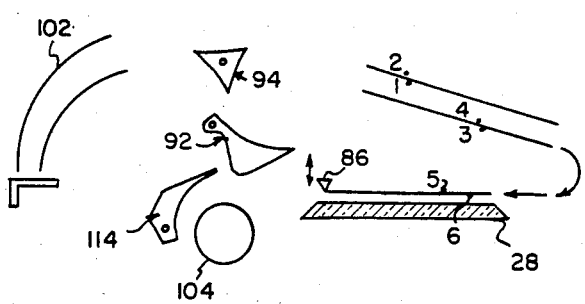
FIGS. 10a–10c are diagramatic illustrations of the operation of the document feeder according to this invention for transporting duplex document sheets showing an intermediate document set circulation.
Figure 10B:
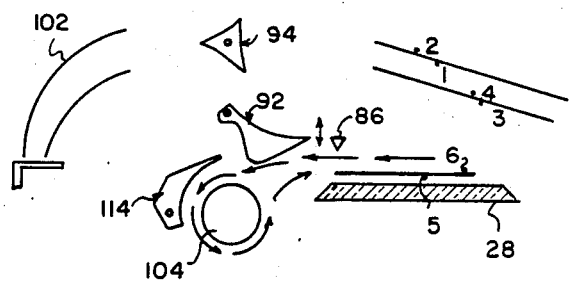
Figure 10C:
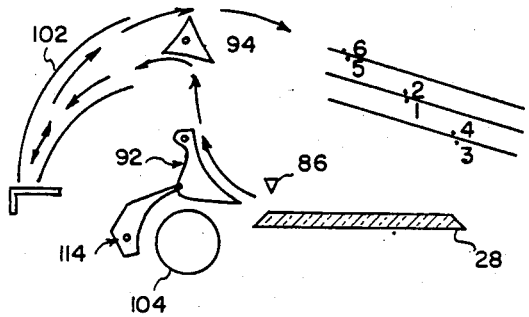
Figure 11:
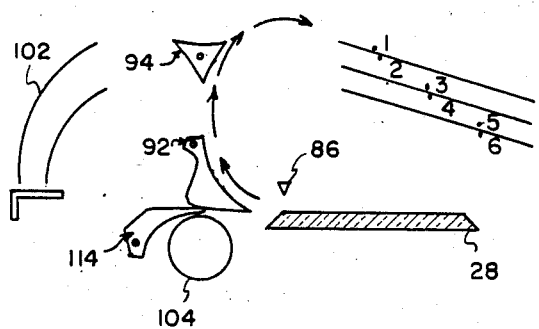
FIG. 11 is a diagramatic illustration of the operation of the document feeder according to this invention for transporting duplex document sheets showing the last document set circulation.

FIGS. 10a–10c show, subsequent document sheet circulation, except for the last circulation. As is apparent from FIG. 10a, when the bottom-most document sheet is removed from the hopper 64 and advanced to overlie the platen, page 6 is directed toward the platen. Such sheet may then be immediately registered by the gate 86 and exposed to make a reproduction thereof (see FIG. 10a). Thereafter, the gate 86 is raised and such sheet is advanced from the platen, turned over, and returned to the platen in the manner described above with page 5 directed toward the platen to be exposed to make a reproduction thereof (see FIG. 10b). As shown in FIG. 10c, after page 5 is exposed such sheet is advanced from the platen, turned over by device 102, and returned to the hopper 64 in the same facial orientation as established after its first circulation (i.e. page 6 on top). This procedure is repeated for each document sheet until the desired number of reproductions thereof, less one, have been made with such reproduction being made at the full apparatus reproduction rate and in the proper sequential order for collated stacking.

The last circulation of the document sheets of the set S, and the reproduction of the pages thereof in the proper sequential order for collated stacking, occurs substantially the same as described above for the sheet circulations subsequent to the first circulation. However, after the first and second exposure of a document sheet are made as described with reference to FIGS. 10a and 10b, such sheet is returned directly to the hopper 64. That is to say, diverter 92 and 94 are positioned so that the returning document sheet by-passes the turn-over device 102 (see FIG. 11). As a result, when such sheet is returned to the hopper 64, it is in its initial facial orientation (i.e. page 5 on top). Thus when the copy procedure is completed for each document sheet, the document sheet set S is once again in its page sequential order, page 1 on top. The operator can then remove the document sheet set and does not have to reorient the individual sheets to place the sheets in their original order.

At times it is desirable to make one or more reproductions of an individual document sheet which is otherwise not readily handled in a recirculating manner. The document feeder 12 is also capable of positioning such individual document sheets for reproduction of information contained on one face or both faces thereof. As shown in FIG. 2, when the feeder 12 is in operative relation with the reproduction apparatus 10, an entrance throat 146 for individual document sheets is provided to the right of the platen 28. A transport mechanism 148 for such individual document sheets is located between the throat 146 and the platen. The mechanism 148 comprises, for example, a pair of feed rollers 150 supported in the feeder 12 and selectively driven in a clockwise direction. The rollers 150 respectively cooperate with nip rollers 152 supported in the reproduction apparatus 10 to advance a sheet inserted in the throat 146 toward the platen. A sensor 154 detects the insertion of an individual document sheet into the throat 146 and actuates the transport 148 to advance such sheet toward the platen.

Figure 12:
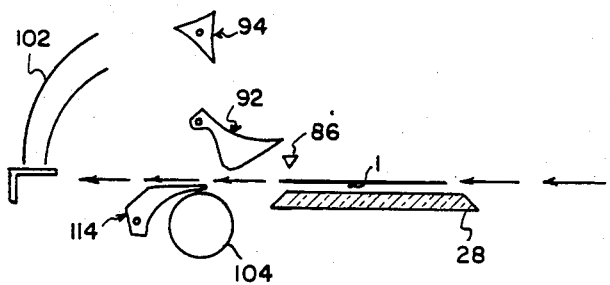
FIGS. 12 and 13 are diagramatic illustrations of the operation of the individual document sheet positioner of the document feeder according to this invention, respectively showing positioning of individual simplex document sheets and positioning of individual duplex document sheets.

When it is desired to reproduce information contained on only one face of an individual document sheet (e.g. a simplex document sheet), such sheet is inserted in the throat 146 with the information-containing face directed downwardly. The transport mechanism 148 then advances such sheet to the transport mechanism 74. The mechanism 74 is driven so that the belt 76 moves about its closed loop path in a clockwise direction to advance such sheet across the platen into registered engagement with the gate 86 positioned in its registration location. The information contained on such sheet thus is directed toward the platen 28 and is exposed to enable a reproduction thereof to be made. Thereafter, the gate 86 is elevated and the transport mechanism 74 advances such sheet under the gate into the nip rollers 88. The diverters 92 and 114 are located in their respective positions shown in FIG. 12 to direct such sheet out of the left side of the feeder 12 into a catch tray 156 located on the side of the reproduction apparatus 10 (see FIG. 1) for operator retrieval.

Figure 13:
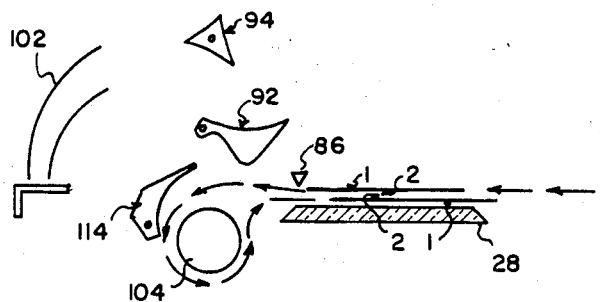

To automatically sequentially reproduce information contained on both faces of an individual document sheet, the feeder makes effective use of the turn-over device 100. The document sheet is inserted in the throat 146 with the face containing page 1 directed upwardly. As shown in FIG. 13, such sheet is advanced over the platen 28, registered against gate 86, and exposed to enable a reproduction of page 2 to be made in the manner described above. However, after exposure and when such sheet is advanced into the nip roller 88, the diverter 114 is positioned to direct such sheet to the roller 104 of the device 100 where such sheet is turned over and returned to the platen 28 with page 1 directed toward the platen in the manner described above with reference to reproducing information contained on both faces of recirculating document sheets (e.g., FIG. 9a). Such sheet is similarly registered against gate 86 and page 1 is exposed to enable a reproduction thereof to be made. Thereafter, diverter 114 is moved to its position shown in FIG. 12 and such sheet is advanced to the catch tray 156. As is the case in reproducing recirculating document sheets, the reproductions are made in proper sequential order and the full reproduction rate of the reproduction apparatus is utilized.

The invention has been described in detail with particular reference to preferred embodiment thereof, but it will be understood that variations and modifications can be effected within the spirit and scope of the invention.

We claim:
1. For use with a copier apparatus having an exposure station, a recirculating document feeder for feeding document sheets seriatem to and from such exposure station for reproducing information contained on one face of such document sheets, or for reproducing information contained on both faces of such document sheets at a rate which makes maximum use of the full repro- duction rate of the copier apparatus, said document feeder comprising:

a hopper for supporting a stack of document sheets in an initial facial orientation:

first transport means for advancing the document sheets along a first travel path extending from said hopper, such first travel path having a portion located adjacent to the exposure station of said copier apparatus;

second transport means, communicating with said first travel path, for advancing the document sheets along a second travel path extending from said portion of said first travel path to said hopper;

third transport means, selectively communicating with said portion of said first travel path, for advancing the document sheets from said portion, turning such sheet over, and returning such sheet to said portion;

fourth transport means, selectively communicating with said second travel path for advancing the document sheets from said second travel path, turning such sheet over, and returning such sheet to said second travel path; and control means, operatively associated with said respective transport means, for effecting (1) when reproduction of information on only one face of such document sheets is desired, feeding of the document sheets seriatem from said hopper along said first and second travel paths back to said hopper; and (2) when multiple reproductions of information on both faces of the document sheets are desired, feeding such document sheets seriatem from said hopper, each document sheet during a first circulation being: (a) transported along said first path to said third transport means, (b) turned over by said third transport means and returned to said portion of said first travel path where information on one face of said each document sheet directed toward the exposure station of said copier apparatus is exposed, (c) returned to said third transport means, (d) turned over by said third transport means and again returned to said first travel path portion where information on the opposite face of said each document sheet directed toward the exposure station is exposed, (e) transported along said second travel path to said fourth transport means, (f) turned over in said fourth transport means and returned to said second travel path, and (g) returned to said hopper with its facial orientation reversed with respect to its initial facial orientation in said hopper; and said each document sheet during its circulations between its first and last circulation being: (a) transported along said first path to said portion thereof where said one face is exposed, (b) transported to said third transport means, (c) turned over by said third transport means and returned to said first path portion where said opposite face is exposed, (d) transported along said second travel path to said fourth transport means, (e) turned over in said fourth transport means and returned to said second travel path, and (f) returned to said hopper with its facial orientation reversed with respect to its initial facial orientation in said hopper.

2. The invention of claim 1 wherein said control means effecting, when multiple reproducting of information on both faces of document sheets are desired, said each document sheet during its last circulation being: (a) transported along said first path to said portion thereof where said one face is exposed, (b) transported to said third transport means, (c) turned over by said third transport means and returned to said first path portion where said opposite face is exposed, and (d) transported by said second transport means along said second travel path for return to said hopper with its facial orientation being the same as its original facial orientation.

3. The invention of claim 1 further including fifth transport means for advancing a document sheet along a non recirculating travel path as an alternative to paths one and two having a portion coextensive with said portion of said first travel path, and entrance and exit portions respectively communicating with said coextensive portion; and wherein said control means is operatively associated with said fifth transport means for effecting: (1) when reproduction of information on only one face of such sheet is desired, advancing of the document sheet from said entrance portion of said non recirculating travel path to said coextensive portion and thereafter to said exit portion thereof, and (2) when reproduction of information on both faces of the document sheet is desired, (a) advancing such sheet from said entrance portion of said non recirculating travel path to said coextensive portion where one face of such sheet directed toward said exposure station for exposure to reproduce information contained thereon, (b) transporting such sheet to said third transport means where such sheet is turned over and returned to said coextensive portion of said non recirculating travel path where the opposite face of such sheet is directed toward said exposure station for exposure to reproduce information contained thereon, and (c) thereafter advancing such sheet to said exit portion of said non recirculating travel path.

4. The invention of claim 1 wherein said first transport means includes a reversible transport mechanism in operative association with said portion of said first travel path for selectively advancing a document sheet in one direction along said portion or in an opposite direction along said portion.

5. The invention of claim 1 wherein said third transport means includes a roller means for rotatably mounting said roller adjacent to said portion of said first travel path downstream of said exposure station, means for rotating said roller, and means for selectively tacking a document sheet to the peripheral surface of said roller.

6. The invention of claim 5 wherein said third transport means further includes a diverter mounted relative to said roller for pivotable movement, means for selectively moving said diverter to a first position adjacent to said portion of said first travel path for preventing a document sheet from reaching said roller or to a second position intercepting said portion of said first travel path for directing a document sheet from said portion into contact with said roller, and means operatively associated with said roller downstream of said diverter for stripping a document sheet from said roller and directing such sheet back into said portion of said first travel path.

7. In the combination of a copier apparatus having an exposure station and a recirculating document feeder for transporting document sheets seriatem to and from said exposure station, said document feeder being of the type which exposes both sides of a document sheet before returning it to a storage hopper, a method for operating said combination to reproduce multiple copies of information contained on both faces of such document sheets, said method comprising steps of:

during the first circulation of such document sheets, after both sides of each sheet are exposed to reproduce information contained thereon, returning such sheets to the document sheets having an initial facial orientation in the hopper, hopper with their facial orientation reversed with respect to their initial facial orientation in the hopper; and during all subsequent circulations of such document sheets except the last circulation, after both sides of each sheet are exposed to reproduce information contained thereon, returning such sheets to the hopper with their facial orientation reversed with respect to their initial facial orientation in the hopper; and during the last circulation of such document sheets, after both sides of each sheet are exposed to reproduce information contained thereon, returning such sheets to the hopper with their facial orientation the same as their initial facial orientation in the hopper.

8. In the combination of a copier apparatus having an exposure station and a recirculting document feeder for transporting document sheets seriatem to and from said exposure station, said document feeder being of the type which exposes both sides of a document sheet before returning it to a storage hopper, a method for operating said combination to reproduce multiple copies of information contained on both faces of such document sheets, such document sheets having an initial facial orientation in the hopper. said method comprising the steps of:

during the first circulation of such document sheets, transporting each sheet, in order, whereby each sheet is (1) advanced past the exposure station without making an exposure, (2) turned over and returned to the exposure station with a first face directed toward the exposure station, (3) such first face is exposed to reproduce information contained thereon, (4) turned over so that its second face is directed toward the exposure station, (5) such second face is exposed to reproduce information contained thereon, (6) and thereafter turned over so that it is returned to the hopper with its facial orientation reversed with respect to its initial facial orientation;

during subsequent circulation of such document sheets except the last circulation, transporting each sheet, in an order, whereby each sheet is (1) advanced to the exposure station with its first face directed toward the exposure station, (2) such first face is exposed to reproduce information contained thereon, (3) turned over so that its second face is directed toward the exposure station, (4) such second face is exposed to reproduce information contained thereon, and (5) thereafter returned to the hopper with its facial orientation reversed with respect to its initial facial orientation; and during the last circulation of such document sheets, transporting each sheet, in an order, whereby each sheet is (1) advanced to the exposure station with its first face directed toward the exposure station, (2) such first face is exposed to reproduce information contained thereon, (3) turned over so that its second face is directed toward the exposure station, (4) such second face is exposed to reproduce information contained thereon, and (5) thereafter turned over so that it is returned to the hopper with its facial orientation the same as its initial facial orientation.

* * * * *